J. R. BAKSTAD.
ELECTRIC HEATER.
APPLICATION FILED OCT. 7, 1920.
1,398,167.
Patented Nov. 22, 1921.
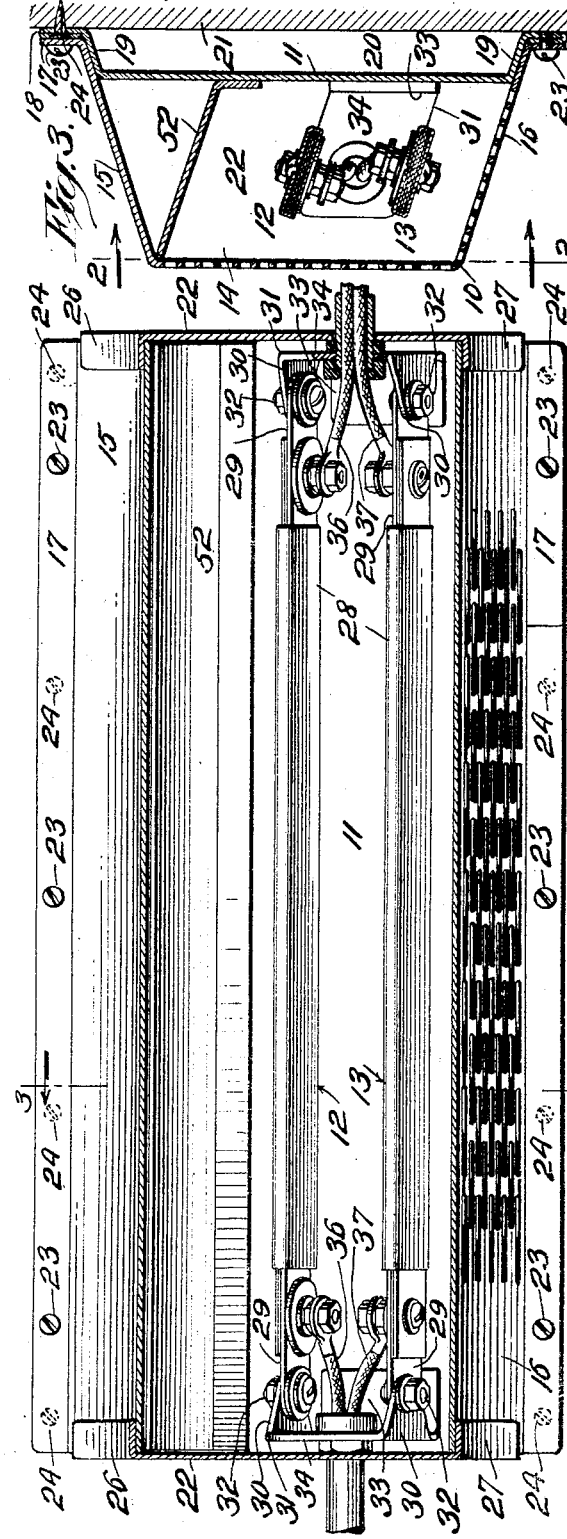
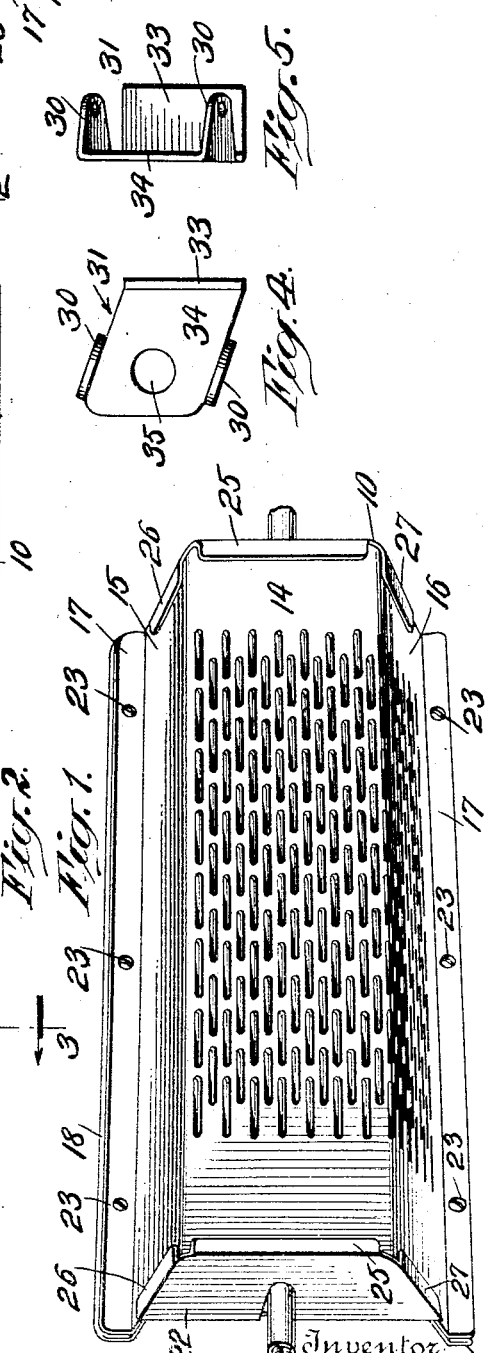
Inventor:
JOHAN R. BAKSTAD,
Attorney,
Charles C. Gill

UNITED STATES PATENT OFFICE.

JOHAN R. BAKSTAD, OF CHICAGO, ILLINOIS, ASSIGNOR TO HOLDEN & WHITE, INC., OF CHICAGO, ILLINOIS, A CORPORATION OF ILLINOIS.

ELECTRIC HEATER.

1,398,167.  Specification of Letters Patent.  Patented Nov. 22, 1921.

Application filed October 7, 1920. Serial No. 415,292.

*To all whom it may concern:*

Be it known that I, JOHAN R. BAKSTAD, a citizen of the United States, and a resident of Chicago, in the county of Cook and State of Illinois, have invented certain new and useful Improvements in Electric Heaters, of which the following is a specification.

The invention relates to electric heaters intended for the heating of railway cars and the like, and it resides more particularly in a novel construction of heater applicable to the truss-planks or walls of railway cars and therefore designated by me as an electric heater of truss plank type. The purpose of this invention, among other objects, is to provide a heater of the truss plank type which shall be efficient, compact, light in weight, easily installed and comparatively inexpensive.

The heater comprises a body casing having a flat front, forwardly converging upper and lower sides, and a back plate adapted in its main part to fit within, to a suitable extent, the upper and lower sides of the body casing and be secured to flanges formed on the edges of said sides and also to the truss plank or wall. The body casing is imperforate over its top or upper side and perforated throughout its front and bottom or lower side, and the said back-plate, to which the body casing may be readily applied, carries a deflector for directing the heated air through the front of the body casing and also appropriate means supporting the resistance element or elements which I apply within the heater.

The body casing is in the nature of a hollow shell of convenient outline in cross section, and the back plate therefor carrying what may be termed the operative mechanism is adapted to receive and permit the removal therefrom of said casing as occasion may require. The heating element employed by me within the heater is of the type known commercially as the Cutler-Hammer unit, and I may employ one or more of these units within the casing, as may be preferred or found necessary. In the presentation of the invention herein I illustrate the employment of two of the Cutler-Hammer units within the casing of the heater.

The invention will be fully understood from the detailed description hereinafter presented, reference being had to the accompanying drawings, in which:

Figure 1 is a perspective view of an electric heater constructed in accordance with and embodying my invention;

Fig. 2 is a vertical section through the same, taken on the dotted line 2—2 of Fig. 3, said section merely removing the front wall of the heater casing;

Fig. 3 is a vertical section through the same, taken on the dotted line 3—3 of Fig. 2;

Fig. 4 is a side elevation of one of the supporting brackets for the heating elements, and Fig. 5 is a front elevation of the same, the supporting brackets being adapted to receive the heating elements and carried by the back plate of the heater.

In the drawings, 10 designates the main casing of the heater and 11 the back plate therefor. The heating elements are designated by the numerals 12, 13 and they are, as aforesaid, of the Cutler-Hammer type and commercially well known.

The casing 10 comprises in one integral piece a front 14, a top 15 and a bottom 16 and said casing is hollow so as to form an adequate chamber for the heating elements 12, 13. The front 14 and bottom 16 are perforated for the escape of the heated air. The top and bottom 15, 16, respectively, extend forwardly on converging lines, as shown in Fig. 3, and at their outer edges merge into the vertical front 14. At their inner edges the top and bottom members 15, 16 are flanged vertically, as at 17, and at said flanges engage the upper and lower flanges 18 formed at the upper and lower edges of the back plate 11, which back plate at the inner edges of the flanges 18 extends inwardly, as at 19, closely along the inner surfaces of the top and bottom members 15, 16 to a suitable extent for accomplishing several purposes, one being to aid in supporting the casing 10, another to create an air space 20 at the back of the heater and between the plate 11 and the truss plank or wall 21 and a third being to properly position the deflector 52 and heating elements 12, 13 within said casing 10. The back plate 11 while entering within the outline of the inner portions of the top and bottom members 15, 16, at its end edges matches the inner vertical edges of the ends 22 with which the casing 10 is equipped, thereby leaving an open space between the inner edges of the ends 22 and the truss plank or wall 21 corresponding with the space 20 indicated in Fig. 3. The flanges 18 of the back plate 11 and the flanges 17 of the body casing 10 are correspondingly perforated to receive screws 23 by means of which said body casing may be secured in position upon said back plate after the back-plate has been fastened to the truss plank or wall 21 by means of screws 24 whose heads are concealed by the flanges 17 of the casing 10, said screws 24 being indicated by dotted lines in Fig. 2. The back-plate 11 is first secured to the truss-plank or wall 21 by means of the screws 24, said back-plate at the time carrying the deflector 52 and resistance elements 12, 13, and thereafter the body casing 10 is applied over the forwardly projecting body portion of said back plate 11 or to the position shown in Fig. 3, and said body casing is then secured in position by means of the screws 23. It will be obvious that upon the withdrawal of the screws 23, the body casing 10 may be removed without disturbing the back-plate 11, so as to expose the heating elements 12, 13 and deflector 52 for such attention as these parts may require.

The ends 22 applied on the body casing 10 conform to the general outline in cross-section of said casing, as shown in Fig. 1, and said ends are of sheet metal and formed with front flanges 25 and upper and lower flanges 26, 27, all of which flanges pass upon the end edge portions of the casing 10 and are preferably permanently secured thereto by electric welding or otherwise. The ends 22 by engaging the upper and lower members 15, 16 of the casing 10 bind said members together, and said ends when equipped with the flanges 25, 26, 27 and welded to the body casing 10, afford such strength to the casing as to permit the casing to be made of reasonably thin sheet metal.

The deflector 52 is a sheet metal plate welded or otherwise secured to the back-plate 11 and inclining upwardly and forwardly to the upper front corner of the casing 10, as shown in Fig. 3, and said deflector compels the exit of heated air through the perforated front of the casing, other portions of the heated air escaping through the perforated bottom 16 of said casing.

The heating elements 12, 13 are alike and, as hereinbefore explained, of commercial type and commonly designated as the Cutler-Hammer unit. This unit, as is well known, comprises a ribbon of flat nichrome wire which is wound around a flat mica core and the whole is inclosed within a flat steel casing which becomes heated and which I number 28, this casing being of sheet steel folded over to envelop the interior portions of the unit. A strip of mica is located between the ribbon and the casing 28 to provide for the necessary electrical insulation, as usual.

The Cutler-Hammer unit is more particularly described in Letters Patent No. 795,747 dated July 25, 1905 and No. 811,859 dated February 6, 1906, and since said unit forms no portion of my present invention, aside from its connection with the mountings provided by me, I do not enter into a detailed description of the unit. Each unit comprises a bar 29 which extends beyond the ends of the steel casing 28, as shown in Fig. 2, and the ends of the bars 29 I secure to ears 30 of supporting frames 31 by means of screw bolts 32. The frames 31 are each formed with a base-plate 33, which is preferably secured by welding to the back-plate 11, and also with a forwardly projecting plate 34 which inclines upwardly and forwardly, as shown in Figs. 2, 3 and 4, and has at its upper and lower edges the ears 30 to which the ends of the bars 29 of the resistance elements are secured. The forwardly projecting plates 34 of the frames 31 are apertured, as shown in Fig. 4, at 35, and the conductors 36, 37 leading to and from the respective elements 12, 13 extend through recesses in the ends 22 of the heater casing and through said openings 35 in the frames 31, the terminal ends of said conductors being secured by bolts, as shown in Fig. 2, to the bars 29 of the resistance elements. In the present instance I illustrate two of the resistance elements 12, 13, but if desired only one of said elements may be made use of in connection with my heater, since my invention does not reside in the details of the resistance elements or heating units, nor in the number thereof, but in the casing and in the frames 31 adapted to properly support a unit or units in proper location within the body casing of the heater and below the deflector 52.

The details of the frames 31 are important in permitting the ready application of the heating elements to position, and the removbility of the body casing 10 is of advantage, since when said body casing is removed, the back plate 11 may remain in position and continue to support the heating elements 12, 13 while they receive such attention as may be required. The heating elements 12, 13 may also be quickly applied to position and removed from the frames 31 as occasion may require. The formation of the back-plate 11 is important in the production of a satisfactory heater casing and in the formation of an air space 20 between the back of the heater and the truss plank 21, and the fact that the body casing 10 may be removed and restored to position without disturbing the heating units or their connections is a feature of considerable advantage.

Cross-reference is made to my copending application Serial No. 415,293 filed October 7, 1920, for electric heaters, showing in different form, arrangement and organization some of the general features of my present invention, the heater described in said application 415,293 being of vertical construction and adapted for conditions incident to the heating of vestibules of cars, whereas, the heater of this application is of horizontal construction and adapted to the truss planks of cars and to the conditions incident to the location of the heater at a truss plank.

What I claim as my invention and desire to secure by Letters-Patent, is:

1. An electric heater of the character described comprising a horizontally elongated casing having a front, forwardly converging upper and lower sides flanged vertically at their inner edges, a back-plate fitted within the back portions of said upper and lower sides and having flanges to engage a wall and to receive the flanges on said casing, means securing said back plate to the wall independently of said casing, means removably securing the flanges of said casing to the flanges of said back-plate and a heating resistance within said casing and supported from said back-plate, said back-plate forming an air space behind it, and said body casing being perforated for the escape of heated air.

2. An electric heater of the character described comprising a horizontally elongated casing having a front, forwardly converging upper and lower sides flanged vertically at their inner edges, a back-plate fitted within the back portion of said casing and having flanges to engage a wall and to receive the flanges on said casing, means removably securing said casing to the flanges of said back-plate, a heating resistance within said casing and supported from said back-plate, and ends permanently secured upon the ends of said casing and having front and edge flanges to receive the adjacent portions of said casing, said ends terminating at the edges of said back-plate so as to therewith form an air space behind said plate.

3. An electric heater of the character described comprising a horizontally elongated casing having a front, ends, and forwardly converging upper and lower sides, a back-plate fitted within the back portion of said casing and having flanges to engage a wall, means removably securing said casing to said back-plate and a heating resistance within said casing and supported from said back-plate, said resistance comprising an elongated bar, and the means for supporting said resistance comprising frames having members facing and secured to said back-plate, forwardly projecting end members which are apertured for the passage of the electrical connections and horizontal arms extending alongside of the ends of said bar and receiving and supporting the same, the ends of said casing being slotted to pass over the electrical connections without disturbing the same.

4. An electric heater of the character described comprising a horizontally elongated casing having a front, forwardly converging upper and lower sides and ends, a back-plate adapted to be secured to a wall, means removably securing said casing to said back-plate, a heating resistance within said casing and supported from said back-plate and a deflector supported by said back-plate above said resistance and extending to the upper front corner of said casing, said casing being perforated at its front and lower side and the ends of said casing being slotted to pass over the electrical connections without disturbing the same.

5. An electric heater of the character described comprising a horizontally elongated casing having a front, forwardly converging upper and lower sides, a back-plate fitted within the back portion of said casing and adapted to be secured to a wall independently of said casing, means securing said casing to said back-plate independently of the means securing the back-plate to the wall and a heating resistance within said casing and supported from said back-plate, said back-plate forming an air space behind it, and said body casing being perforated below its top for the escape of heated air.

6. An electric heater of the character described comprising a horizontally elongated casing having a front, forwardly converging upper and lower sides, a back-plate fitted within the back portion of said casing and adapted to be secured to a wall independently of said casing, means securing said casing to said back-plate independently of the means securing the back-plate to the wall and a heating resistance within said casing and supported from said back-plate, said back-plate forming an air space behind it, and said body casing being perforated below its top for the escape of heated air and said casing having ends permanently secured thereto and having front and upper and lower inwardly projecting flanges receiving the adjacent end portions of said casing.

Signed at Chicago, in the county of Cook and State of Illinois, this 27th day of September, A. D. 1920.

JOHAN R. BAKSTAD.